United States Patent Office 3,519,286
Patented July 7, 1970

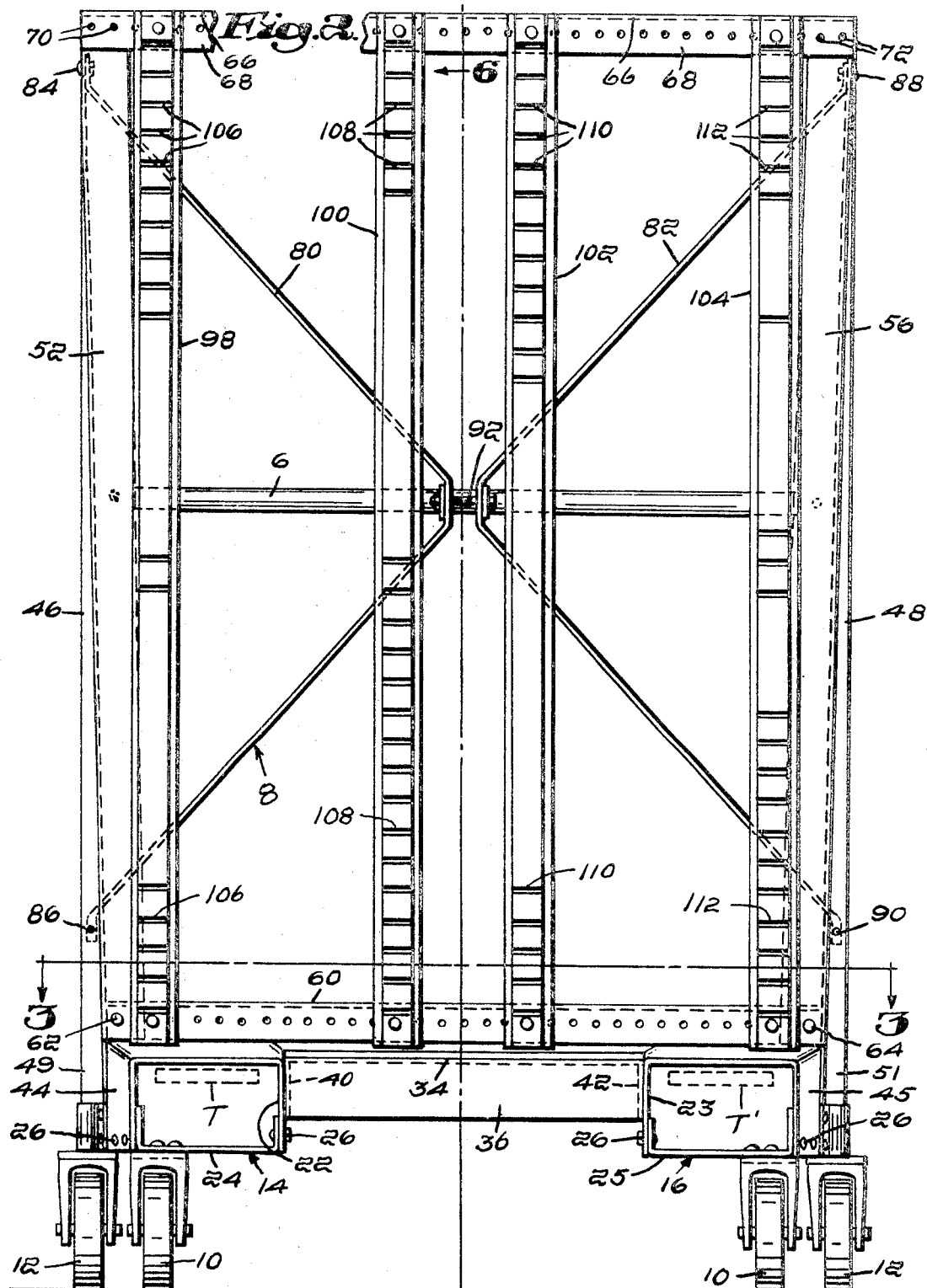

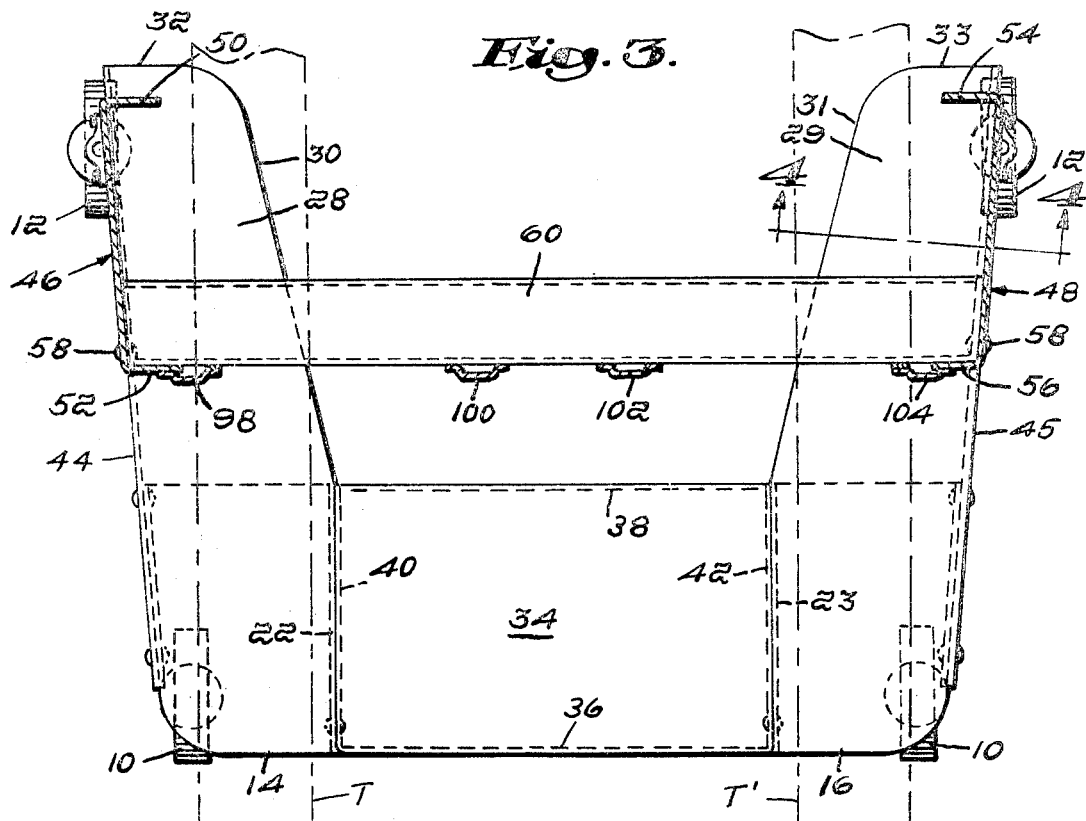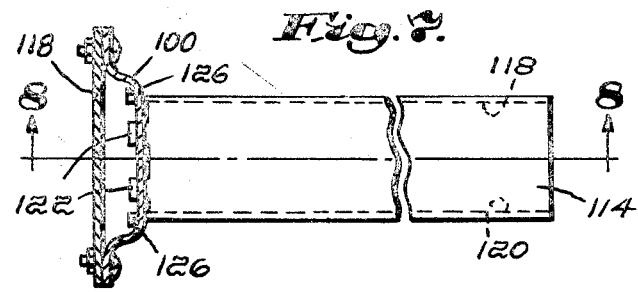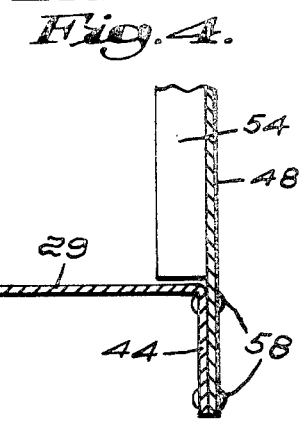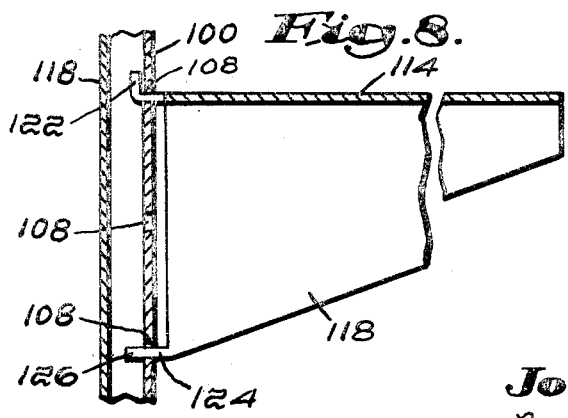

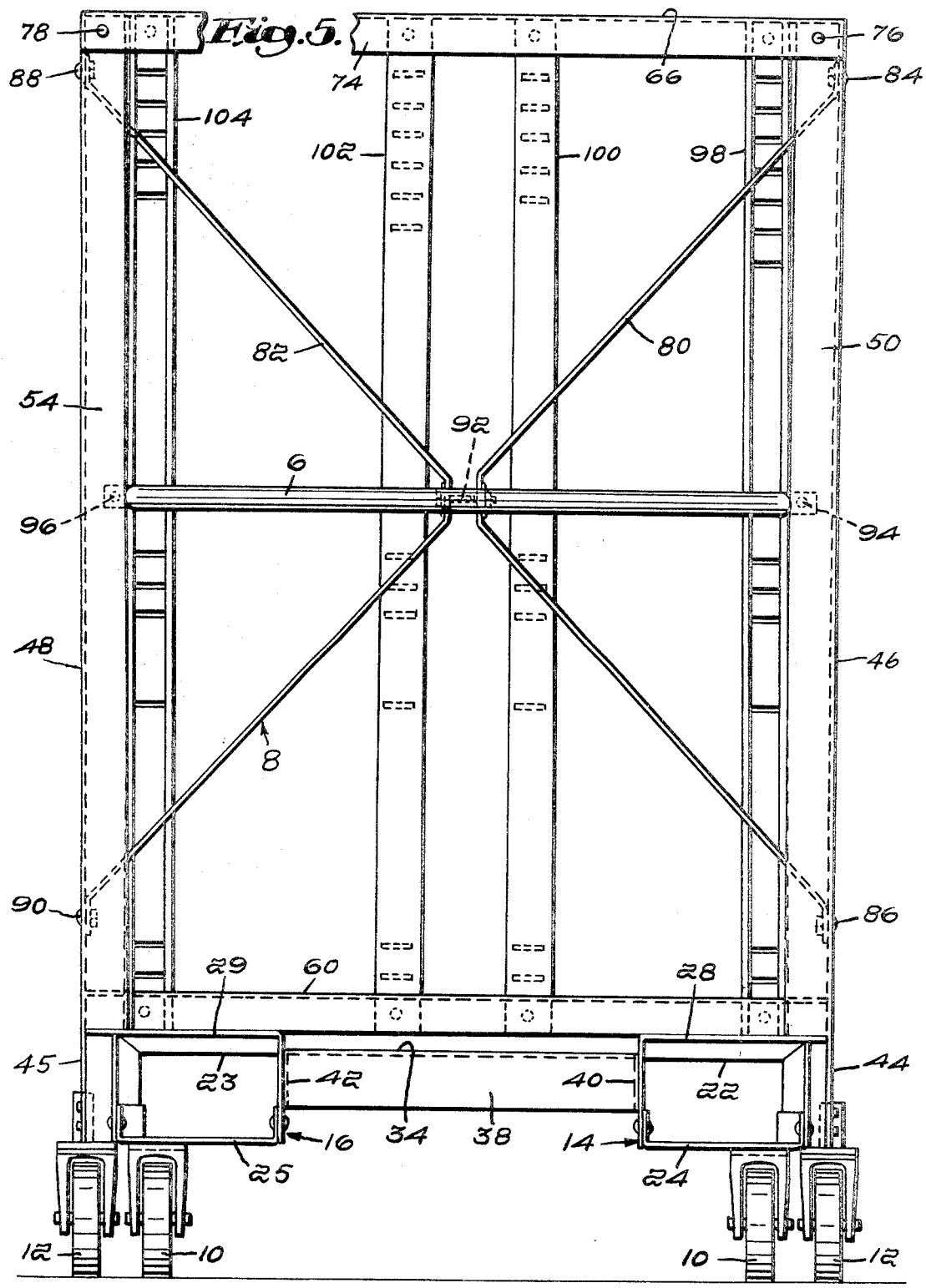

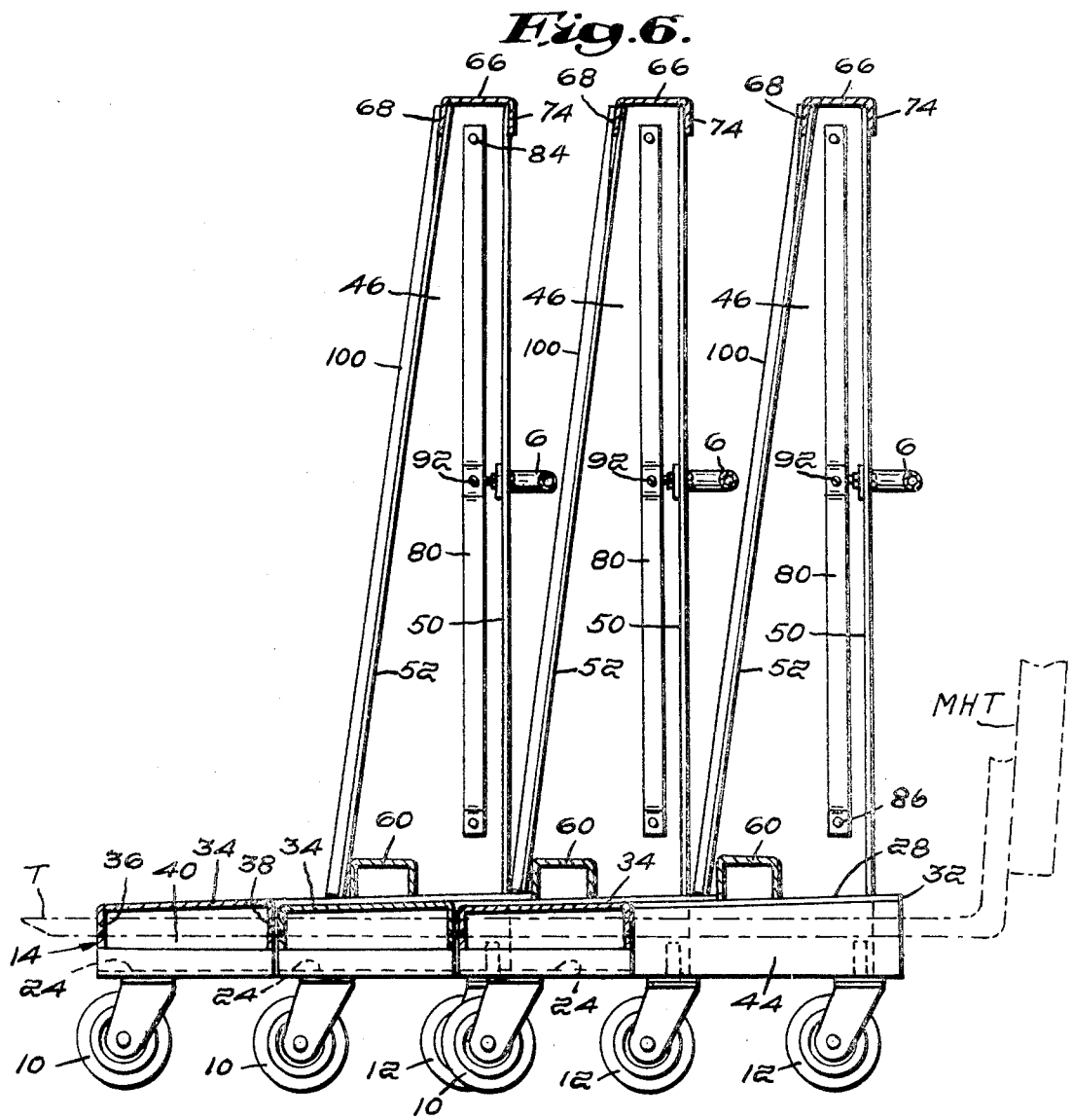

3,519,286
INDUSTRIAL TRUCK
Johan M. Andersen, Hopkinton, Mass., assignor to Duplicon Company, Inc., Westboro, Mass., a corporation of Massachusetts
Filed Oct. 1, 1968, Ser. No. 764,270
Int. Cl. B62b 11/00
U.S. Cl. 280—33.99                           7 Claims

ABSTRACT OF THE DISCLOSURE

An industrial truck normally pushed by hand for moving goods about a factory. Each truck is so designed that it may be nested with other similar trucks. Portions of the base of the truck are constructed to provide spaced, unobstructed, front to rear openings. By this construction, the tines of a fork of a conventional power driven industrial lift truck may be inserted in the aligned openings of several of the nested trucks whereby they may then be picked up simultaneously by the fork truck for transportation rapidly over greater distances.

BACKGROUND OF THE INVENTION

Manually propelled trucks for use in transporting goods in process from one operation to another in a factory are old and well known. These trucks have assumed many forms, such as, for example, wheeled carts on which tote boxes may be placed. In recent years, nestable trucks of a more upright character such as those shown in the patents to Andersen et al. No. 3,046,003 and Andersen No. 3,324,787 have come into use. Pat. No. 3,046,033 shows means whereby an individual truck may be picked up by a power driven fork lift truck for quicker movement over the required distance. The prior art, however, is silent on the concept of picking up two or more nested industrial trucks for transportation as a group at speed and over substantial distances. The construction of the present invention not only permits such group movement in complete safety, but also allows each truck to be utilized individually in conventional manner as a manually movable unit.

It should also be pointed out that it is old, broadly, to support products on trucks in various ways such as on pegboards, in boxes placed on forwardly extending cantilever supports or by merely placing articles on the truck base to lean against thes upwardly extending face.

SUMMARY OF THE INVENTION

The invention constitutes an individual industrial cart or truck so designed that it and other identical trucks may be nested together when not in use to occupy a minimum space. The trucks when loaded may also be nested to a degree limited only by the forward extent of the goods carried thereby.

Each truck at its forward lower base portion has a longitudinally extending aperture designed to be aligned with corresponding apertures in all other similar trucks whereby when the trucks if unloatded and fully nested, or if loaded and partially nested, are adapted to receive the spaced tines of a power driven fork truck so that two or more trucks may be simultaneously raised from the floor and moved rapidly to a new location. Preferably, the apertures into which the tines of the fork of the lift truck are placed are tubular in configuration thereby making it impossible for the picked up truck to tip over while being moved by the power driven lift truck.

BRIEF DESCRIPTION OF THE DRAWINGS

FIG. 2 is a front elevation looking from the left of FIG. 1.
FIG. 3 is a horizontal section looking downward on the line 3—3 of FIG. 2.
FIG. 4 is an enlarged detail taken on the line 4—4 of FIG. 3.
FIG. 5 is a vertical elevation of the rear of the truck looking from the right of FIG. 1.
FIG. 6 is a vertical section taken on the line 6—6 of FIG. 2 showing three unloaded trucks in nested position with the tine of a lift truck shown in lifting relation in dot and dash line.
FIG. 7 is an enlarged plan view taken on the line 7—7 of FIG. 1.
FIG. 8 is a vertical section taken on the line 8—8 of FIG. 7.

DESCRIPTION OF THE PREFERRED EMBODIMENT

Figure 1:
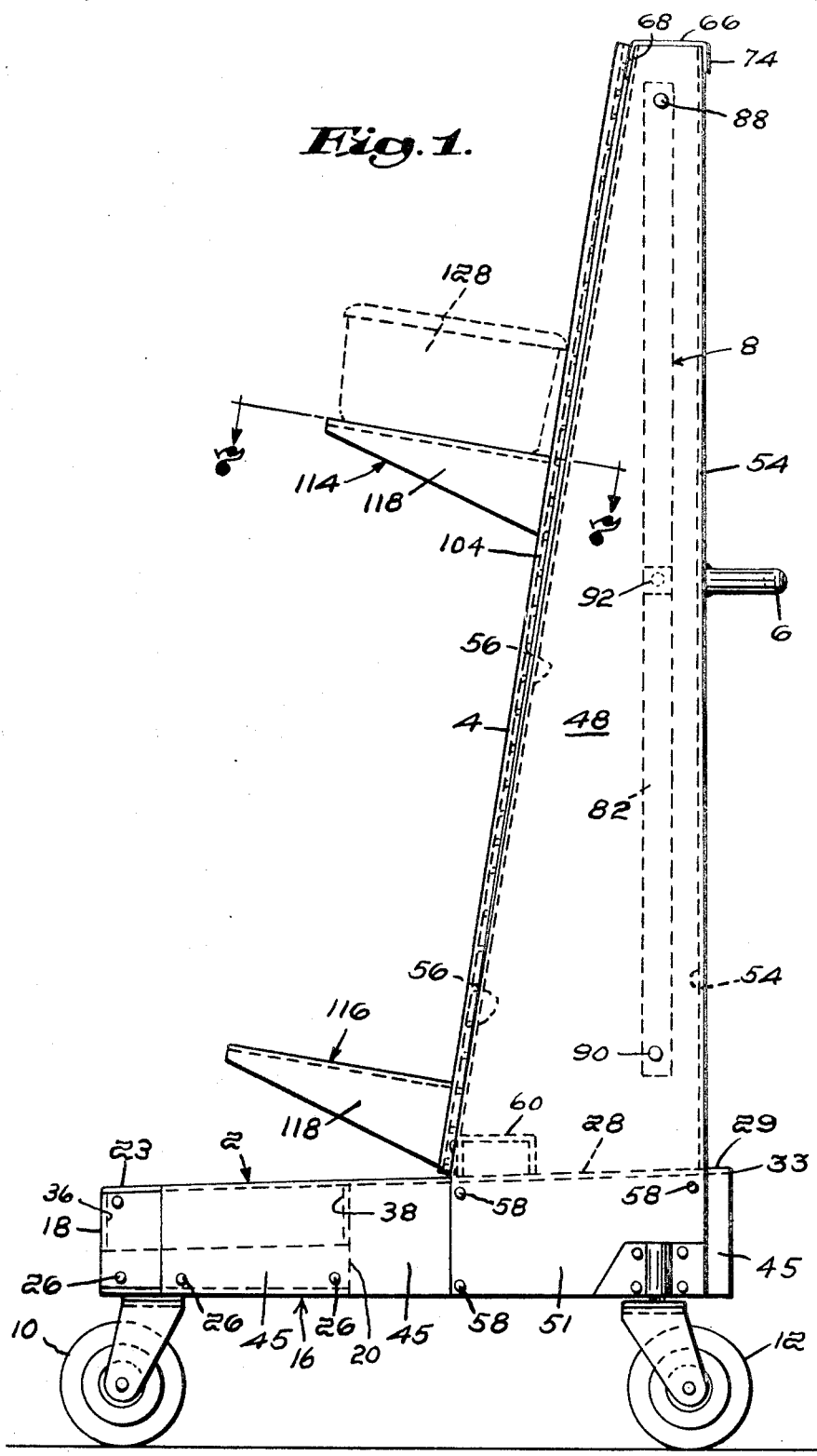
FIG. 1 is a side elevation of a preferred construction.

As can best be seen in FIGS. 1, 2, 5 and 6, the truck or cart comprises a base 2, an upwardly extending load supporting portion 4, a handle 6 and bracing means 8. This structure is mounted on four castered wheels 10, 12 located generally at the four corners of the base 2. In the preferred form, all of the various parts are made of heavy sheet metal suitably bent to provide angles and channels which may be readily riveted or welded together to give adequate rigidity of the entire structure in the light of the loads to be carried.

The base 2 comprises a rigid crosswise extending front frame consisting of two spaced portions 14 and 16 open from front to rear which extend from the front at 18 to a rear position 20. These open portions, suitably connected by intermediate bracing, may be made in any convenient manner, but in the form shown are tubular and comprise inverted channels 22 and 23 and cooperating upwardly facing channels 24 and 25 both of which together taper with increasing dimensions both laterally and vertically to the rear. These channels are preferably riveted or bolted together, as indicated at 26. The horizontal portions of the inverted channels 22 and 23 extend further to the rear as indicated at 28 and 29 with outwardly spreading edges 30 and 31 which terminate at rear edges 32 and 33.

The tubular portions 14 and 16 are held in rigid spaced relation by an inverted open box-like member comprising an intermediate plate 34 having downturned front and rear walls 36 and 38 and downturned sidewalls 40 and 42. The sidewalls 40 and 42 are riveted or welded to the walls 22 and 23. For extra security, the ends of walls 36 and 38 may be welded to the ends of walls 40 and 42. The castered wheels 10 are fixed to the underside of portions 14 and 16 at their forward outer corners and the rear castered wheels 12 may be secured to the outer vertical walls 44 and 45 which are rearward extensions of the outer walls of the inverted channels 22 and 23. Walls 44 and 45 are coextensive to the rear for the same distance as upper extensions 28 and 29. The method of attachment of the wheels to the base may assume any convenient form, the only requirement being that the wheels and their mountings be adequate to carry the required loads and to roll easily when the track is manually moved.

The upper load supporting frame of the truck comprises a pair of preferably tapered spaced channels 46 and 48 having inturned endwalls 50, 52 and 54, 56, respectively. These inturned walls terminate immediately above the horizontal upper base walls 28 and 29, but the vertical webs 49 and 51 of the channels extend downwardly to overlap the vertical walls 44 and 45 of the base. The overlapping portions of webs 49 and 44 and 51 and 45 are riveted or bolted together as indicated at 58. The channels 46 and 48 are further supported by a horizontal channel 60 the front wall of which is bolted to the vertically extending channel walls 52 and 56, as at 62 and 64, see FIG. 2.

The upper ends of vertical members 46 and 48 are capped with an inverted channel 66 with the forward depending transverse wall 68 being bolted to the flanges 52 and 56 of members 46 and 48, respectively, as indicated at 70 and 72 in FIG. 2. The rear flange 74 is bolted to flanges 50 and 54 as at 76 and 78, see FIG. 5.

In order to give the upright frames 46 and 48 still further rigidity, braces 80 and 82 are fastened to walls 46 and 48 at 84, 86, 88 and 90, respectively, and secured together under tension by a tensioning bolt 92.

To facilitate pushing or pulling of the cart, the handle 6 is located on the rear side of the upwardly extending supports 46 and 48 at a convenient height, its ends being bolted to flanges 50 and 54 at 94 and 96, see FIG. 5.

The structure for supporting the goods to be carried by the truck may take any convenient form. In the present instance, the supporting means is in the form of a plurality of vertical shallow channels 98, 100, 102 and 104 which are transversely slotted over their length as at 106, 108, 110 and 112. These slots serve as means for mounting a plurality of cantilevered arms 114 and 116, for example, shown in FIG. 1 at any selected elevations. With the arms extending forwardly from channels 98, 100, 102 and 104 at selected levels, it is obvious that many arrangements for supporting the goods may be created. It is to be understood, however, that instead of the channels 98, 100, 102 and 104, there might be substituted any other arrangement of load carrying mechanism such as, for example, a solid sheet of material perforated in the manner of a conventional pegboard to carry supports for the goods or for containers in which the goods are placed. No invention, however, resides in the detailed goods carrying supports and no claim is made thereto except as part of the combination.

Details of the cantilevered arms 114 and 116 are shown in FIGS. 7 and 8. Each arm may be in the form of a narrow inverted channel with depending flanges 118 and 120. The shallow channel 100 (representative of any of the channels) is bolted to a vertically extending narrow strip 118 for additional support. The horizontal slots 108 may receive therein the upturned ends 122 extending to the rear from the arm 114. With these ends 122 in position, the lower part of side walls 118 and 120 are squeezed together so that the extensions 124 may be placed within a lower slot 108 and then allowed to expand with the outturned ends 126 of the extension 124 locked behind the channel walls at the ends of slot 108. By this simple arrangement, the arms 114 and 116 may be placed at suitable levels to support tote boxes or other containers 128 indicated in dotted line in FIG. 1. If desired, goods may be loaded directly on the surface provided by members 14 an 16 and the intermediate support 34.

In FIG. 6, which is a section on line 6—6 of FIG. 2, a tine T, illustrated in dot and dash lines and extending from a power driven material handling truck MHT, is shown as positioned in the three aligned tubular portions 14 of three nested trucks. The other tine T' will extend through the other aligned tubular portions 16 as shown in FIG. 2.

Since the tines T and T' when in lifting position also underlie the rearwardly extending horizontal portions 28 and 29 of each truck, the center of gravity of each truck will fall within the base provided by the tines so that the load on the tines will be stable.

It is intended to cover all changes and modifications of the examples of the invention herein chosen for purposes of the disclosure which do not constitute departures from the spirit and scope of the invention.

I claim:

1. A nestable shop truck comprising a base mounted on wheels, and an upwardly extending structure mounted on said base for supporting a work load to be carried by said truck, said base comprising a rigid, crosswise extending front frame having two laterally spaced unobstructed horizontal front to rear openings, said crosswise extending front frame having extensions thereof running to the rear and of greater width and height than the said crosswise extending front frame, said extensions comprising means on which said upwardly extending structure is mounted, the dimensions of all parts of said truck to the rear of said crosswise extending front frame being such that the front end of a second identical truck may be placed within the confines of said extensions of said first truck and the spaced horizontal front to rear openings through the front frames of said trucks will be in alignment and adapted to receive the spaced tines of the fork of a power driven material handling truck.

2. A truck as set forth in claim 1, said rigid crosswise extending front frame comprising two spaced tubular members rigidly connected by intermediate bracing means.

3. A truck as set forth in claim 1, said rigid crosswise extending front frame comprising two spaced tubular members rigidly connected by intermediate bracing means and additional crosswise bracing extending between and above said extensions and within the horizontal confines of and secured to said upwardly extending structure.

4. A truck as set forth in claim 1, said rigid crosswise extending front frame comprising two spaced sheet metal tubular members rectangular in cross section, said members connected by intermediate bracing means in the form of a four sided box of sheet metal secured at opposite sides to said tubular members.

5. A truck as set forth in claim 1, said work supporting structure comprising channels each with a tapered web and inwardly extendin flanges, said channels secured at their lower ends to the said extensions, the upper ends of said channels secured together by a crosswise extending member.

6. A truck as set forth in claim 1, each of said extensions comprising generally horizontal and vertical portions which are integral with and extend to the rear from the top and side surfaces of said front frame.

7. A nestable shop truck comprising a base mounted on wheels, and an upwardly extending structure mounted on said base for supporting a work load to be carried by said truck, said base comprising a rigid crosswise extending front frame formed of two spaced sheet metal tubular members rectangular in cross section and connected by intermediate bracing in the form of a four sided box of sheet metal secured at opposite sides to said tubular members, the tops and outer sides of said tubular members having extensions running to the rear beyond said bracing box, said upwardly extending structure comprising two channels each with a tapered web and inwardly extending flanges, said webs secured at their lower ends to the outer sides of said rear extensions, an additional lower crosswise bracing member extending between and above said rear extensions and secured to said oppositely disposed channels, the upper ends of said channels secured together by an upper crosswise bracing member, and other means carried by said channels and related lower and upper crosswise bracing members for supporting a work load.

(References on following page)

References Cited

UNITED STATES PATENTS

| | | | | |
|---|---|---|---|---|
| 2,689,133 | 9/1914 | Goldman | | 280—33.99 |
| 2,809,796 | 10/1957 | Averill | | 108—53 |
| 2,827,302 | 3/1958 | Skyrud | | 280—33.99 |
| 3,046,033 | 7/1962 | Andersen et al. | | 280—33.99 |
| 3,118,684 | 1/1964 | Kappen | | 280—33.99 |
| 3,224,787 | 12/1965 | Andersen | | 280—33.99 |

BENJAMIN HERSH, Primary Examiner

M. L. SMITH, Assistant Examiner

U.S. Cl. X.R.

108—53

UNITED STATES PATENT OFFICE
CERTIFICATE OF CORRECTION

Patent No. 3,519,286                                    July 7, 1970

Johan M. Andersen

It is certified that error appears in the above identified patent and that said Letters Patent are hereby corrected as shown below:

Column 1, line 33, "3,046,003" should read -- 3,046,033 --; lines 33 and 34, "3,324,787" should read -- 3,224,787 --; line 61, "unloatded" should read -- unloaded --.

Signed and sealed this 23rd day of March 1971.

(SEAL)
Attest:

Edward M. Fletcher, Jr.                          WILLIAM E. SCHUYLER, JR.
Attesting Officer                                         Commissioner of Patents